US009521294B2

(12) United States Patent
Majewicz et al.

(10) Patent No.: US 9,521,294 B2
(45) Date of Patent: Dec. 13, 2016

(54) ADJUSTING DIGITAL IMAGES FOR PARALLAX

(75) Inventors: Peter Majewicz, Boise, ID (US); Teresa M O'Keeffe, Boise, ID (US); Lixia Li, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 109 days.

(21) Appl. No.: 14/397,243

(22) PCT Filed: Jun. 4, 2012

(86) PCT No.: PCT/US2012/040735
§ 371 (c)(1),
(2), (4) Date: Oct. 27, 2014

(87) PCT Pub. No.: WO2013/184092
PCT Pub. Date: Dec. 12, 2013

(65) Prior Publication Data
US 2015/0139567 A1 May 21, 2015

(51) Int. Cl.
*G06K 9/40* (2006.01)
*H04N 1/393* (2006.01)
*H04N 1/38* (2006.01)
*H04N 1/00* (2006.01)
*H04N 1/10* (2006.01)
*H04N 1/409* (2006.01)
*H04N 5/217* (2011.01)

(52) U.S. Cl.
CPC .......... *H04N 1/393* (2013.01); *H04N 1/00482* (2013.01); *H04N 1/10* (2013.01); *H04N 1/38* (2013.01); *H04N 1/409* (2013.01); *H04N 5/217* (2013.01)

(58) Field of Classification Search
CPC .... G06K 9/00; G06K 9/2054; G06K 2209/01; G06K 9/00469; G06K 9/222; G06K 9/18; G06K 9/186; G06K 9/228; G06K 9/03
See application file for complete search history.

(56) References Cited

U.S. PATENT DOCUMENTS

| | | |
|---|---|---|
| 5,084,611 A | 1/1992 | Okisu et al. |
| 5,416,609 A | 5/1995 | Matsuda et al. |
| 5,616,914 A | 4/1997 | Matsuda |
| 6,611,292 B1 | 8/2003 | Tsai et al. |
| 7,313,259 B2 | 12/2007 | Alyassin et al. |
| 2004/0256754 A1 | 12/2004 | Koguchi |
| 2008/0247638 A1 | 10/2008 | Tanida et al. |
| 2009/0059242 A1 | 3/2009 | Fujieda et al. |
| 2011/0122231 A1 | 5/2011 | Fujieda et al. |

FOREIGN PATENT DOCUMENTS

WO    WO-99/48291 A1    9/1999

OTHER PUBLICATIONS

International Search Report and Written Opinion, International Application No. PCT/US2012/040735, Date of Mailing: Jan. 29, 2013, pp. 1-8.

*Primary Examiner* — Duy M Dang
(74) *Attorney, Agent, or Firm* — Fabian VanCott

(57) ABSTRACT

Adjusting digital images for parallax includes receiving (401) a digital image of an object on a platform from a camera positioned over the platform and adjusting (402) a magnification of a top surface of the object in the digital image based on a height of the object.

18 Claims, 4 Drawing Sheets

ADJUSTING DIGITAL IMAGES FOR PARALLAX

BACKGROUND

Photocopiers are image capture devices that copy relatively flat and two dimensional documents. Some photocopiers have a glass flatbed scanner with a moveable scanner and/or a sheet fed scanner where the document sheets move pass the scanner. The resulting photocopies are the same size as the original document unless a user specifically instructs otherwise. Many photocopiers allow a user to enlarge or reduce the size of the image based on a percentage of the documents' overall surface area.

Another type of image capture device uses a digital camera that is positioned above a platform upon which a document is held. To obtain a copy with this device, the digital camera takes a digital image of the document. This type of image capture device has less moving parts than the traditional photocopiers.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

When a digital image is taken of a close object, the object appears larger. This phenomenon is referred to as parallax. Most, if not all, photos exhibit some degree of parallax, which allows viewers of the photo to determine which objects in the image are close and which objects are farther away. However, when the image of a document or a three dimensional object is taken at a close range with a wide field of view lens, the resulting image may cause the document to appear larger than expected. Such size differences may be undesirable in some circumstances, and a user may expect that a copied document visually appear to be the same size as the original document.

The present specification describes subject matter including, for example, a method for adjusting a digital image for parallax. Examples of such a method include receiving a digital image of an object on a platform from a camera positioned over the platform and adjusting a magnification of a top surface of the object in the digital image based on a height of the object.

In the following description, for purposes of explanation, numerous specific details are set forth in order to provide a thorough understanding of the present systems and methods.

It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
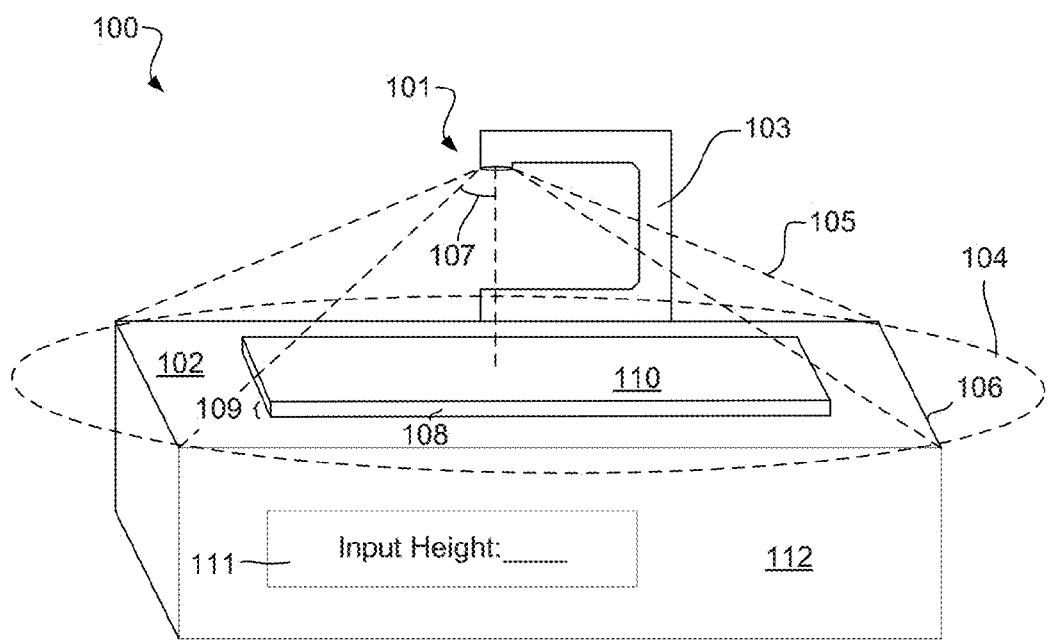
FIG. 1 is a diagram of an illustrative system for taking a digital image, according to principles described herein.

FIG. 1 is a diagram of an illustrative system (100) for taking a digital image, according to principles described herein. In this example, the system has a digital camera (101) positioned over a platform (102). The digital camera (101) is secured to the platform (102) with a post (103) that substantially positions the camera (101) over the center of the platform (102).

In the example of FIG. 1, the digital camera (101) has a field of view (104) directed towards the platform. The field of view (104) may be cropped into a pyramid (105) dimensioned such that the pyramid's base (106) fits the dimensions of the platform (102). In some examples, the field of view angle (107) is between a hundred degrees and sixty degrees. In some examples, the field of view angle (107) is between ninety five degrees and seventy degrees. In some examples, the field of view angle (107) is between ninety degrees and eighty five degrees.

The digital camera (101) may be positioned at a fixed location above the platform (102). In some examples, the camera (101) is spaced at a predetermined distance from platform (102). The predetermined distance may be less than two feet, less than one foot, less than ten inches, less than eight inches, less than six inches, other distances, or combinations thereof.

In some examples, the position of the digital camera (101) is adjustable. For example, the digital camera (101) may be slide into multiple preset locations, with each preset location having a predetermined distance from the platform (102). In other examples, the camera (101) is movable to any location within a range. For example, the camera (101) may be slide along the post (103) to any desired location. In such an example, the system (100) may have a mechanism for determining the distance between the camera (101) and the platform (102). Such a calculated distance may be used to determine a magnification factor, which will be discussed in more detail below.

The platform (102) may have dimensions large enough to hold standard sizes of documents and books. For example, the platform may be dimensioned to hold a letter sized document of 8.5 inches by 11 inches, a legal sized document of 8.5 inches by 14 inches, an executive sized document of 7.25 inches by 10.5 inches, an A4 sized document of 8.27 inches by 11.69 inches, an A5 sized document of 5.83 inches by 8.27 inches, an index card sized document of 3 inches by 5 inches, a postcard sized document of 4 inches by 6 inches, other sized documents, or combinations thereof.

In the illustrated example, an object (108) is placed upon the platform (102). The object may have a height (109) that raises a top surface (110) of the object above a level of the platform (102). Any object may be placed onto the platform (102) to be photographed. In some examples, the object (108) is a document. A user may place the document on the surface of the platform (102) with the document's text and/or images facing towards the camera (101). The digital camera (101) may photograph the document to capture an image of the document. Once the image is taken, the system (100) may store the image in memory, print the image, send the image to another location, alter the image, perform another task with the image, or combinations thereof.

A user interface (111) may be located on a base (112) of the platform or other location on the system. In some examples, the user interface (111) is in wireless communication with the processors, camera, or other components of the system. In some examples, the user interface (111) is incorporated into a device in communication with the system (100), such as a desktop computer, a laptop, tablet, phone, watch, other device, or combinations thereof. The user interface (111) may contain options, such to copy the image, print the image, store the image, the transmit the image, reduce/enlarge the image, input the height of the object in the image, adjust the image, change the lighting on the image, change the brightness of the image, other options, or combinations thereof.

In this example, the user interface (111) is requesting the user to input the height (109) of the object (108). In examples where the object has some height, such as a book or a small object, the objects in the unadjusted digital images may appear larger than expected due to parallax. The system (100) may use the inputted height to calculate a magnification factor to adjust the digital images such that the object appears in the digital image to have the appropriate size. A more detailed explanation of the calculations and adjustments to the digital image will be provided in the examples described below.

The system (100) may also be equipped with a printer to print adjusted images or unadjusted images taken with the digital camera (101). In some examples, the system is connected to a network, such as a local area network, the internet, other types of networks, or combinations thereof, and may send the images taken with the camera (101) as emails, faxes, other forms of electronic transmission, or combinations thereof. Further, the system (100) may be programmed to convert the digital images to a variety of different electronic formats. For example, the system (100) may initially form the image in a Joint Photographic Experts Group (JPEG) format and convert the image to a Portable Document Format (PDF), other formats, or combinations thereof.

Figure 2:
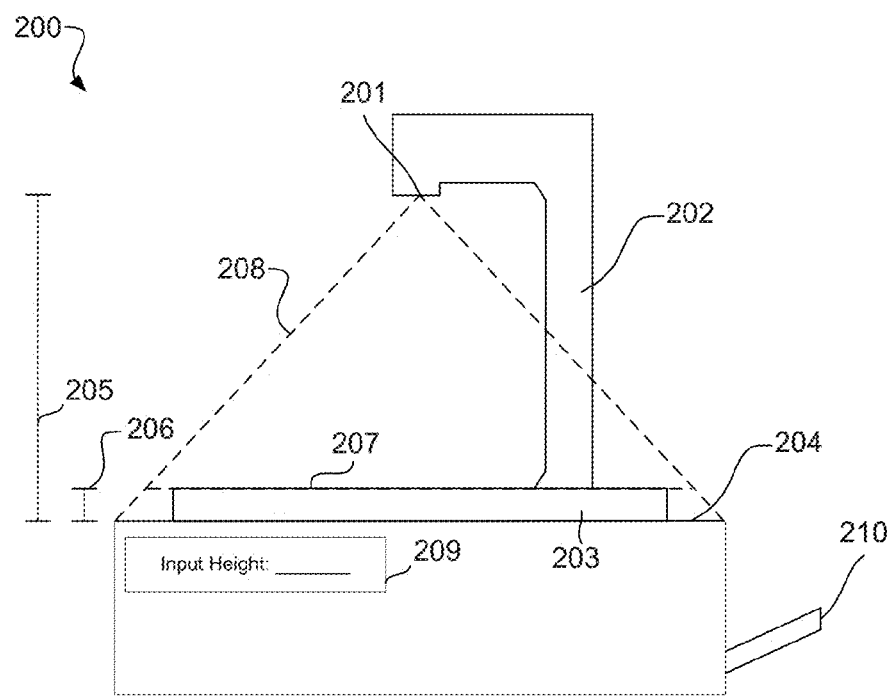
FIG. 2 is a diagram of an illustrative system for taking a digital image, according to principles described herein.

FIG. 2 is a diagram of an illustrative system (200) for taking a digital image, according to principles described herein. In this example, the camera (201) is supported by the post (202), and the object (203) is supported by the platform (204). The camera (201) is spaced apart from the platform (204) at a predetermined, fixed distance (205). The object may have a height (206) that is less than the predetermined distance (205).

As a height (206) of the object (203) increases, the object's top surface (207) occupies more of the field of view pyramid (208) and effectively causes the top surface (207) to appear larger through the camera's lens. As a consequence, the object's top surface (207) appears larger than expected when a digital image is taken.

Before a user takes an image of the object (203) with the camera (201), a user may input into the user interface (209) the height (206) of the object (203). In some examples, the post (202) has height marks to assist a user when determining the object's height (206). In other examples, the system (200) has a compartment to hold a ruler, tape measure, or other height measuring device for the user's convenience.

In some examples, the system (200) has a mechanism for determining the height without input from the user. For example, a depth sensor may be incorporated into the system (200) adjacent the digital camera (201) and may determine how far the object's top surface is away from the digital camera (201). Once this distance is determined, the system (200) may derive the object's height (206) from this measurement. In some examples, a depth sensor includes an infrared camera, a time of flight sensor, other distance measuring mechanism, or combinations thereof.

In FIG. 2, a user interface (209) is requesting the height (206) of the object (203) from the user. Requesting the height (206) directly from the user may be less expensive than a depth sensor or other height measuring mechanism. Further, requesting the user to input the height (206) reduces associated circuitry for additional processing and reduces the system's processing time to take and adjust digital images.

In some examples, the system (200) has a printing mechanism that may be internal to the system (200). The printing mechanism may print the image and convey a printed image of the object into a printing tray (210). In other examples, a printer is in communication with the system with a cable, wireless transmitters, over a network, or combinations thereof.

Figure 3:
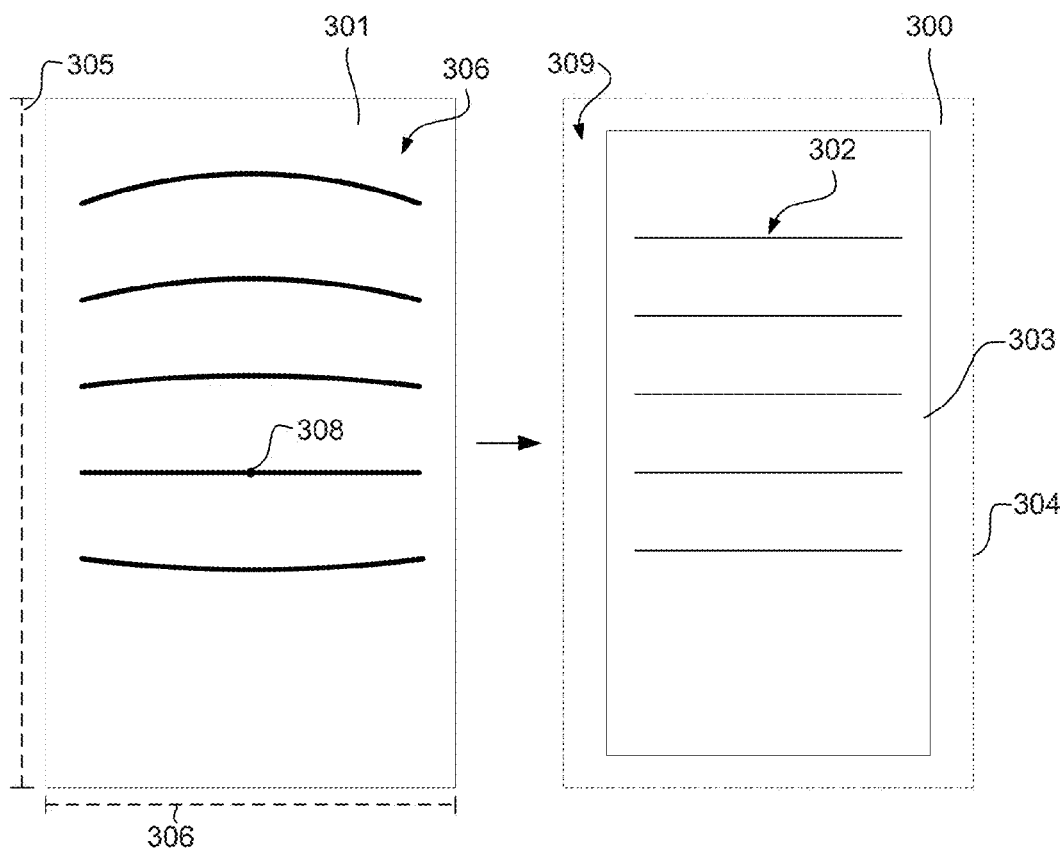
FIG. 3 is a diagram of an illustrative adjusted digital image, according to principles described herein.

FIG. 3 is a diagram of an illustrative adjusted digital image (300), according to principles described herein. In this example, an unadjusted digital image (301) is depicted adjacent to an adjusted digital image (300) after applying distortion correction and magnification factor. In this example, the object is a packet of papers, and the top surface of the object contains text (302). The packet has a height that causes the top surface to be higher than the platform, and therefore, closer to the digital camera. As a consequence, the text (302) appears larger in the unadjusted digital image (301) than in the original object due to parallax. Thus, when compared side by side, the unadjusted digital image (301) appears to have a different size to the user than the actual object. The user may dislike such a difference between the unadjusted digital image and the original, especially when the user is attempting to make a copy for an official purpose.

In the example of FIG. 3, the perimeter (303) of the top surface appears in the digital image (301) as though the perimeter (303) extends all the way to the edges (304) of the platform when the top surface's perimeter (303) does not. As a consequence, the text (302) in the unadjusted digital image (301) has a larger length (305) and width (306).

In the illustrated example, the unadjusted image (301) has a lens distortion error (307). Such an error (307) may be more pronounced the wider of the field of view angle the camera uses to capture an image of the object. In some examples, the lens distortion error (307) causes a flat top surface to appear to be curved or spherical. In some examples, the lens distortion error (307) is less pronounced towards the center (308) of the image, but the error (307) progressively increases its distortion farther away from the center (308).

The digital image (301) may be processed to create the adjusted digital image (300). In some examples, the lens distortion error (307) is corrected prior to accounting for the unadjusted image (301) for parallax.

The lens distortion error (307) may be corrected by normalizing the distorted points of the digital image (301) to reflect a more accurate position. In some examples, to correct the error (307), an undistorted point of the image may be used as the image center for calculation purposes. In the example of FIG. 3, the center (308) of the image is also used as the undistorted point. In some examples, the undistorted point is slightly distorted or off centered from the center (308) of the digital image (301). After determining the point to be used as the undistorted point, the following equation may be applied:

$$r_u = r_d + k_1 r_d^3,$$

where $r_u$ is the undistorted radius from the undistorted point, and $r_d$ is the distorted radius, and $k_1$ is a coefficient dependant on parameters of the camera. In other examples, Brown's distortion model is used to correct the distortion error (307).

After correcting the lens distortion error (307), the image may be adjusted for parallax. The digital image (301) may be reduced by a magnification factor to cause the object's top surface in the digital image (301) to appear as though the top surface is as far away from the digital camera as the platform. In other words, applying the magnification factor may make the adjusted digital image (300) appear as though the top surface of the object is level with the platform. An image taken of an object with negligible height may appear to the user to have no parallax affect, and as a consequence, an image of the object's top surface may appear to the user as though the image of the object and the actual object are the same size.

The magnification factor may be determined with the following equation:

$$M=((h_p-h_o)/h_p)(100\%),$$

where M is the magnification factor; $h_p$ is the predetermined distance between the digital camera and the platform, such as the predetermined distance (205) referenced in FIG. 2; and $h_o$ is the height of the object, such as the object's height (206) referenced in FIG. 2. The height of the object may be determined through a manual input from the user or the height may be determined automatically by the system.

In some examples, the lens distortion error (307) is corrected prior to applying the magnification factor. In this manner, distortion errors (307) are not modified during the image's magnification adjustments and ensure that the lens distortion error (307) is properly corrected.

Reducing the magnification of the digital image (301) may create a border (309) in the adjusted digital image (301). This border (309) may be filled with a color that matches the color of the platform. In some examples, the user has the option through the user interface to choose a border color. In some examples, the user interface may give the user an option to crop the image.

In some examples, the system automatically adjusts the digital image (301) to fix other errors besides those created due to parallax or lens distortion. In some examples, the interface gives the user an option to adjust the digital image (300) for such errors. Further, the user interface may give the user an option to edit the digital image (301) through the user interface. For example, the user interface may give the user an option to modify the size, color, brightness, hue, contrast, other parameter of the image, or combinations thereof. In some examples, the user interface allows the user to add text, symbols, marks, or other visual features. Further, the user may have the option to remove feature of the image, such a lines, erasure marks, pencil or pen marks, crease marks, other marks, or combinations thereof.

Figure 4:
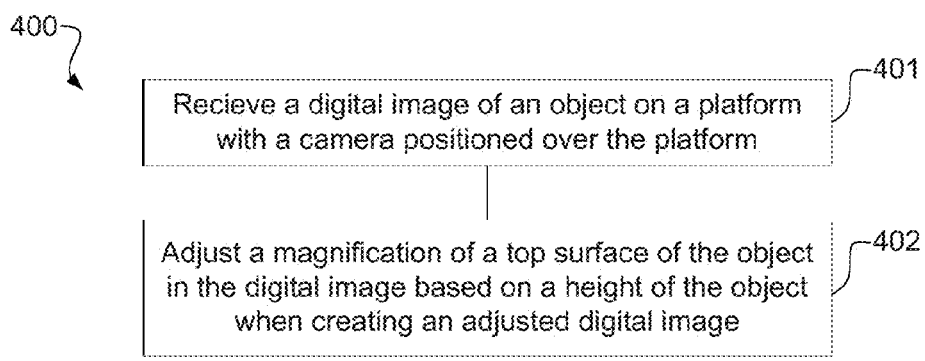
FIG. 4 is a diagram of an illustrative method for adjusting a digital image, according to principles described herein.

FIG. 4 is a diagram of an illustrative method (400) for adjusting a digital image, according to principles described herein. In the example of FIG. 4, the method (400) includes receiving (401) a digital image of an object on a platform with a camera positioned over the platform and adjusting (402) a magnification of a top surface of the object in the digital image based on a height of the object when creating an adjusted digital image.

In some examples, a user who is taking the digital image selects a magnification correction mode with a user interface in communication with the camera. The user interface may allow the user to select several options, such as to copy an image of the object placed on the platform, resize the image, change other parameters of the image, other options, or combinations thereof. In some examples, the magnification correction mode is selected prior to taking the image. Further, the user interface may also request the height of the object prior to taking the image.

However, in alternative examples, the user interface may accept instructions to adjust the magnification of the image after the image is taken. In such examples, the image may be presented to the user through the user interface after the image is corrected for lens distortions errors. The user may compare the object with the image in the user interface and may input an instruction through the user interface to resize the digital image for parallax. In other examples, if the user is unsatisfied with the image displayed in the user interface, the user may retake another image of the object in the magnification correction mode.

In some examples, the height is determined by a manual input into a user interface in communication with a processor that determines the amount of magnification to adjust the digital image. In alternative examples, the method (400) includes determining the height of the object automatically without user input.

In some examples, the image is resized such that the top surface in the digital image appears to be spaced as far away from the digital camera as the platform. In some examples, an image is adjusted by reducing the top surface by a magnification factor M determined by $M=((h_p-h_o)/h_p)$ (100%), where $h_p$ is a distance between the camera and the platform supporting the object and $h_o$ is the height of the object.

Figure 5:
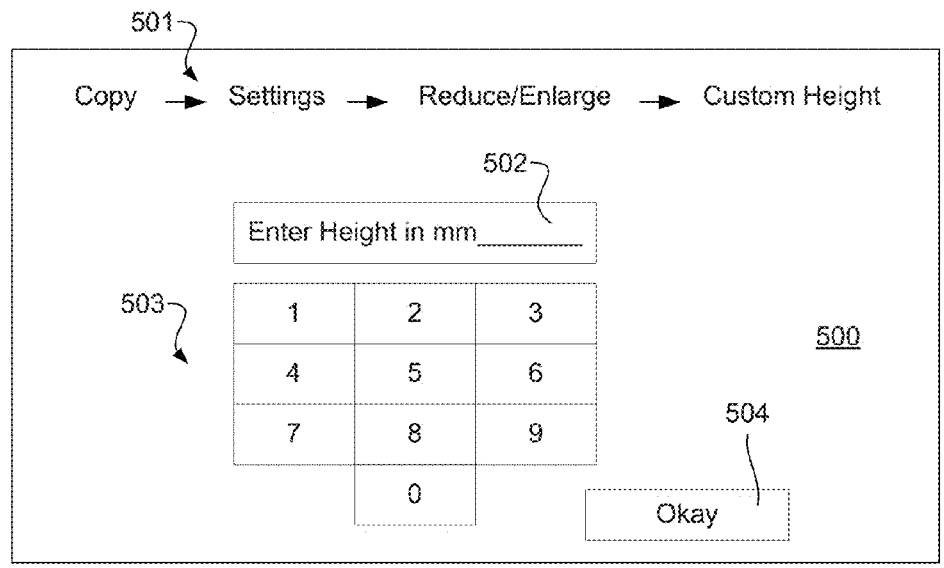
FIG. 5 is a diagram of an illustrative user interface, according to principles described herein.

FIG. 5 is a diagram of an illustrative user interface (500), according to principles described herein. The user interface (500) may be incorporated into a base of the platform that supports the object or another location in the system. In some examples, the user interface (500) is wirelessly connected to the system. The user interface (500) may be in communication with a processor that adjusts digital images taken with the camera.

The user interface (500) may be incorporated in a display screen, a touch screen, a resistive touch screen, a capacitive touch screen, an optical touch screen, a key pad, a mouse, a video camera to record hand gestures and/or lip movement, a microphone to recognize voice commands, other user interface components, or combinations thereof. In some examples, the user interface (500) presents the user with a menu of options. The menu may include an option to copy an object with the digital camera, search files stored in the system's memory, email a file, convert an image to another electronic format, print an image, adjust an image, perform another task with the image, or combinations thereof.

Under the copy option, the user interface (500) may give the user the option to make a color image or a monochrome image of the object. In some examples, the system assigns an identification number to each image stored in its file. In some examples, the user is given an option to name the image file. In some examples, the system is capable of receiving images through sources other than the digital camera, such as through email. The received images may be adjusted, printed, converted to other electronic formats, or combinations thereof with the system. Further, under the copy option, the user may select a settings option for more options to control the image.

Under the settings option, the user interface (500) may give the user an option to adjust parameters of the image such as lighting, brightness, contrast, other parameters, or combinations thereof. In some examples, the user interface (500) gives the user an option to specify a number of copies to print, an option to resize the image, an option to adjust for magnification error, other options, or combinations thereof.

In the example of FIG. 5, the user interface (500) is displaying an option to correct a magnification error. In this example, a user followed an option path (501) of "Copy," "Settings," "Reduce/enlarge," and "Custom height" to select that the image is to be taken in the magnification error mode. A height field (502) may be displayed in the user interface (500) with a touch pad (503) that allows a user to input the height of the object in millimeters into the field (502). The user may press an "okay" button (504) when the height is entered into the field (502). In some examples, the user interface provides the user a height range consistent with or less than the distance between the camera and the platform.

In some examples, the system applies a magnification factor to images taken with the camera when a height is inputted into the user interface's field (502). On the other hand, when no height is inputted into the user interface, the system may apply a default height to adjust for parallax. In some examples, the default height is zero millimeters and assumes that the object to be photographed has a negligible height, such as a single sheet of paper.

In other examples, the user interface (500) includes a single option of entering just the height of the object. In other examples, the menu option has other options than those depicted above.

While the user interface (500) has been depicted with specific menu options and menu option paths, any number of options arranged in any number of option paths is contemplated to be within the scope of the principles described herein. Further, while the user interface (500) has been depicted with specific input and output components, the user interface (500) may have any number of input and output components.

Figure 6:
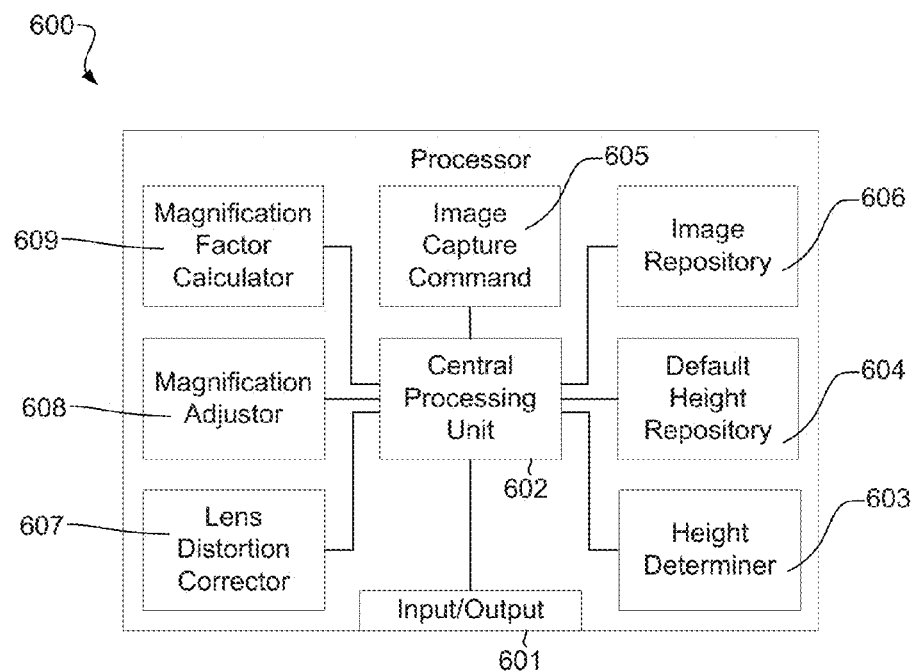
FIG. 6 is a diagram of an illustrative processor, according to principles described herein.

FIG. 6 is a diagram of an illustrative processor (600), according to principles described herein. In this example, the processor (600) has an input/output (601) in communication with a central processing unit (CPU) (602). The input/output may be in communication with a digital camera, a user interface, a printer, memory, other devices, or combinations thereof.

The processor (600) may receive a command from the user interface requesting that a digital image be taken of an object on the platform. In some examples, the processor determines the height of the object prior to making a digital image of the object. If the user inputs a height of the object, the height determiner (603) of the processor (600) may determine that the inputted height value is the height of the object. If no height value is provided, the CPU (602) may consult a default height repository (604) to retrieve a height value for a default height of the object. In some examples, the height determiner is in communication with electronic measuring mechanisms that measure a height of the object.

Upon receipt of the command to make an image of the object, an image capture command (605) of the processor (600) may send a command to the digital camera to capture an image of the object. A digital image of the object may be sent to the processor and stored in an image repository (606).

In the illustrated example, the processor (600) also adjusts the digital image. For example, a lens distortion corrector (607) may adjust the image to reduce and/or eliminate radial distortion of the image. In some examples, the lens distortion corrector (607) uses internal parameters of the digital camera to derive coefficients to correct the distortion.

Also, a magnification adjustor (608) may resize the image by reducing the image with a magnification factor. A magnification factor calculator (609) may determine the magnification factor based on a height of the object. In some examples, the magnification factor is determined by dividing the difference between the object's height and the distance from the camera to the platform by the distance to the platform. In such an example, if the height of the object is one inch and the distance between the camera and the platform is four inches, the magnification factor would be seventy five percent. As a consequence, the magnification adjuster (608) may adjust the image's magnification to seventy five percent of what the digital image originally recorded. In other words, the image may be reduced by twenty five percent.

While specific examples of object heights and distances between the camera and the platform have been used in the previous examples, any object height and distance between the camera and the platform may be used. Further, while particular objects have been depicted in conjunction with the previous examples, any object of any size and/or shape may be photographed with the digital camera provided that the object has a height less than the distance between the camera and the platform.

In some examples, the default height repository (604) is customized per system or per user. For example, if a specific user generally scans objects of a consistent height, the user may customize the default height repository (604) through the user interface to the consistent height. In other examples, the default height is zero millimeters. In such an example, if no height is inputted into the user interface, the processor (600) may skip the processes provided by the magnification factor calculator (609) and the magnification adjustor (608).

In some examples, the adjustments to the image are made prior to storing the image in the image repository (606). However, in alternative examples, the adjustments may be made to the images after they are stored. In such an example, a user may instruct that an image be taken of the object and upon comparing the object with the image, the user may notice differences due to parallax. In such a situation, the user may select the image from the image repository (606) and input a height for the image. The magnification factor calculator (609) may determine the magnification factor, and the magnification adjustor (608) may apply the magnification factor to the image by resizing the image accordingly.

Figure 7:
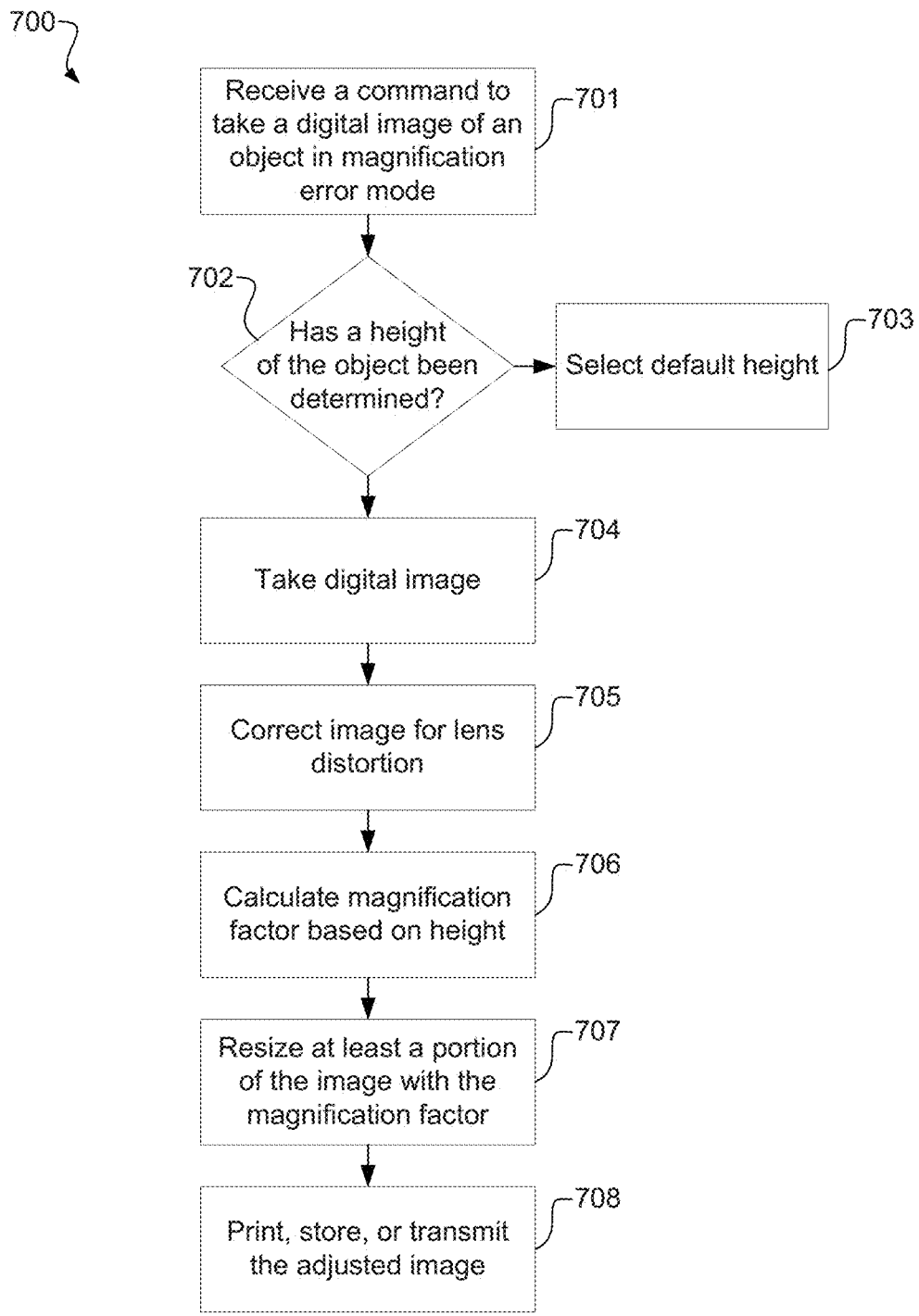
FIG. 7 is a diagram of an illustrative flowchart of a method for adjusting a digital image, according to principles described herein.

FIG. 7 is a diagram of an illustrative flowchart of a method (700) for adjusting a digital image, according to principles described herein. In this example, the method (700) includes receiving (701) a command to take a digital image of an object in magnification error mode. Next, the method may include determining (702) whether the height of the object has been determined. The height may be determined automatically with an electronic instrument or the height may be inputted by a user. In this example, if no height is provided, a default height is selected (703).

The method (700) may further include taking (704) an image of the object and correcting (705) the resulting image for lens distortion. Further, the method (700) may include calculating (706) a magnification factor based on the height of the object. After determining the magnification factor, at least a portion of the image may be resized (707) with the magnification factor.

After the image is adjusted, the image may be printed, stored, or transmitted (708) as desired by the user. In some examples, the user has an option of viewing the image in a display screen, so that the user may determine if another image should be taken or to determine whether further adjustments should be made to the image.

In some examples, the user has an option of resizing the entire image or just a portion of the image. For example, the user may desire to resize just the portion of the image that contains the top surface of the object. In such an example, the user may select the portion of the image to be resized. In other examples, a processor detects the perimeter of the object within the digital image. In this example, the processor may have just the portion of the image within the identified perimeter resized. In some examples, the user is given an option to manually select a portion of the image for resizing, resize just the object, or resize the entire image.

In some examples, a user may be unaware that an image of an object will have a parallax error, and the system may alert the user of the issue through the user interface, a sound, an email, other mechanism, or combinations thereof. In some examples, the system automatically determines the height and corrects for any parallax errors. In some examples, the system automatically corrects for parallax unless otherwise specifically instructed by the user.

While specific examples of determining and inputting a height into the system have been depicted above, any mechanism for determining and/or inputting a height into the system are within the scope of the principles described herein. The system may determine the height automatically or the system may rely on user input.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for adjusting digital images for parallax, comprising:
    receiving a digital image of an object on a platform from a camera positioned over said platform;
    receiving a height of the object at a user interface physical incorporated into the platform and in communication with a processor; and
    adjusting, via the processor, a magnification of a top surface of said object in said digital image based on the height of said object.

2. The method of claim 1, wherein adjusting a magnification of a top surface of said object in said digital image based on a height of said object includes reducing said top surface by a magnification factor M determined by $M=((h_p-h_o)/h_p)(100\%)$, where $h_p$ is a distance between said camera and said platform supporting said object and $h_o$ is said height of said object.

3. The method of claim 1, wherein adjusting a magnification of a top surface of said object in said digital image based on a height of said object includes resizing said image such that said top surface appears to be spaced as far away from said camera as said platform.

4. The method of claim 1, further comprising taking said digital image and selecting a magnification correction mode prior to taking said digital image.

5. The method of claim 1, further comprising correcting said digital image for lens distortion prior to adjusting said magnification.

6. The method of claim 1, further comprising receiving the height of the object at the user interface as user input.

7. The method of claim 1, further comprising receiving the height of the object automatically via the processor.

8. The method of claim 1, further comprising requesting the height from a user via the user interface.

9. A system for adjusting digital images for parallax, comprising:
    a digital camera secured to a platform;
    a processor in communication with said digital camera;
    said processor programmed to:
        receive a digital image of an object on said platform;
        receive a height of the object at a user interface physically incorporated into the platform and in communication with the processor; and
        reduce a magnification of said digital image based on the height of the object such that a top surface of said object in said digital image appears as though said top surface is level with said platform.

10. The system of claim 9, wherein said processor programmed to reduce said magnification of said digital image includes adjusting said magnification of said top surface in said image based on a height (109) of said object by reducing said top surface by a magnification factor M determined by $M=((h_p-h_o)/h_p)(100\%)$, where $h_p$ is a distance between said camera and said platform and $h_o$ is said height of said object.

11. The system of claim 9, wherein said processor is programmed to receive a height of said object from a user interface in communication with said processor.

12. The system of claim 9, wherein said processor is programmed to correct said digital image for lens distortion prior to resizing said digital image.

13. The system of claim 9, wherein said processor is programmed to instruct that said digital image be printed.

14. The system of claim 9, further comprising a default height repository to retrieve a height value for a default height of the object.

15. A non-transitory computer-readable medium storing instructions executable by the computer to:
    instruct that a digital image of an object on a platform be taken with a camera that is spaced apart from said platform by a predetermined distance;
    receive said digital image;
    receive a height of the object at a user interface physically incorporated into the platform and in communication with the processor; and
    adjust said digital image with a magnification factor based on the height of said object.

16. The medium of claim 15, further comprising the instructions executable to determine said height based on an input into a user interface.

17. The medium of claim 15, further comprising the instructions executable to determine a default height in an absence of an input into a user interface.

18. The medium of claim 15, further comprising the instructions executable to correct said digital image for lens distortion prior to adjusting said digital image with said magnification factor.

* * * * *

UNITED STATES PATENT AND TRADEMARK OFFICE
CERTIFICATE OF CORRECTION

| | |
|---|---|
| PATENT NO. | : 9,521,294 B2 |
| APPLICATION NO. | : 14/397243 |
| DATED | : December 13, 2016 |
| INVENTOR(S) | : Peter Majewicz et al. |

It is certified that error appears in the above-identified patent and that said Letters Patent is hereby corrected as shown below:

In the Drawings

In sheet 2 of 4, reference numeral 401, Line 1, delete "Recieve" and insert -- Receive --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*